United States Patent

[11] 3,590,526

| [72] | Inventors | Herman F. Deyerl<br>P.O. Box 1804, Ann Arbor, Mich. 48106;<br>Robert J. Reynolds, 1543 Pine Valley, Ann Arbor, Mich. 48104 |
|---|---|---|
| [21] | Appl. No. | 804,555 |
| [22] | Filed | May 5, 1969 |
| [45] | Patented | July 6, 1971 |

[54] REMOTELY STEERABLE VEHICLE
8 Claims, 2 Drawing Figs.

| [52] | U.S. Cl. | 46/244 B |
|---|---|---|
| [51] | Int. Cl. | A63h 33/26 |
| [50] | Field of Search | 46/201, 213, 244 |

[56] References Cited
UNITED STATES PATENTS
3,144,731  8/1964  Jones et al. ............... 46/201
FOREIGN PATENTS
994,832  6/1962  Great Britain ............ 46/244/B Primary Examiner—Louis G. Mancene
Assistant Examiner—Robert F. Cutting
Attorney—Olsen and Stephenson ABSTRACT: A self-propelled toy vehicle adapted for use on a track or other surface where its steering and speed may be controlled by electromechanical or electronic means. The drive wheels are independently driven at selected speeds and the driven wheels are mounted so that direction of movement of the vehicle can be controlled readily by regulating the relative speeds of the driven wheels.

PATENTED JUL 6 1971   3,590,526

INVENTORS
HERMAN F. DEYERL
ROBERT J. REYNOLDS
BY
*Olsen and Stephenson*
ATTORNEYS

REMOTELY STEERABLE VEHICLE

BACKGROUND OF THE INVENTION

It is well known to make variable speed toy cars of the "slot-type" in which a track with one or more slots is provided, and a different car is used with each slot. Electric controls are provided with each slot for regulating the speed of the associated car, but no steering is required, because each car has a projection extending into its slot to guide the car in relation to the slot. Thus, the operator of each of these cars has no steering control, but merely has control for regulating the speed of the car.

In is desirable to provide improved toy car sets of the foregoing character in which controls for the cars not only regulate their speed, but also permit steering of the cars over a surface, such as a track, without use of the slots. To be able to provide improved sets of this character requires overcoming several problems, one of which relates to the arrangement for steering the cars by the individual operator. The present invention is directed to this particular problem and to providing steering controls that are simple and economical to manufacture, and that require a minumum of motor means for both propulsion and steering purposes.

SUMMARY OF THE INVENTION

The present invention relates to an improved steering and propulsion apparatus for a vehicle, and especially to such a vehicle adapted for use with a model toy car set.

According to a preferred form of the present invention, a wheeled vehicle is provided comprising a frame structure, a pair of drive wheels mounted for independent rotation at one end of the frame, a pair of motor means, such as electric motors, supported on said frame for independent operation and each drivingly connected to a different one of said wheels, and a pair of driven wheels pivotally mounted on casterlike mountings at the other end of the frame. The motor means, or electric motors, are variable speed motors whose speeds can be individually regulated by suitable signals so that not only can the speed of the vehicle be controlled by the operator, but the vehicle can also be steered by the application of different torques on the two driven wheels to turn the opposite end of the frame structure on the two casterlike front wheels of the vehicle.

It is an object of the present invention to provide a vehicle for use with a model toy car set which has an improved propulsion and steering arrangement.

Other objects of this invention will appear in the following description and appended claims, reference being had to the accompanying drawing forming a part of this specification wherein like reference characters designate corresponding parts in the several views.

DESCRIPTION OF THE PREFERRED EMBODIMENT

Figure 1:
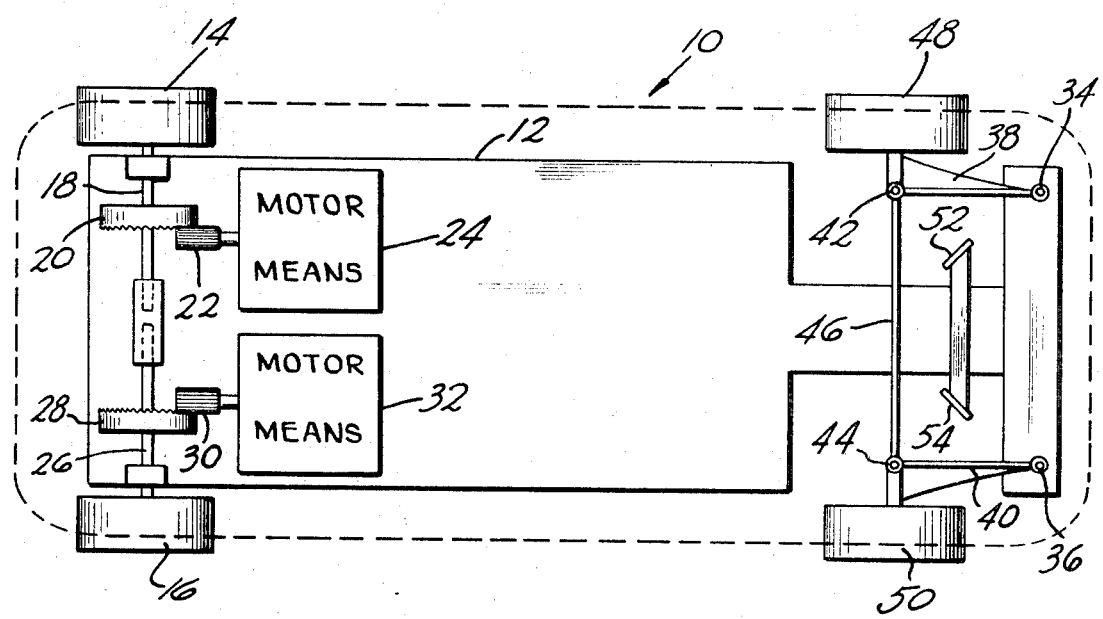
FIG. 1 is a schematic top plan view of a vehicle embodying the present invention, with significant features of the invention in solid lines.
Figure 2:
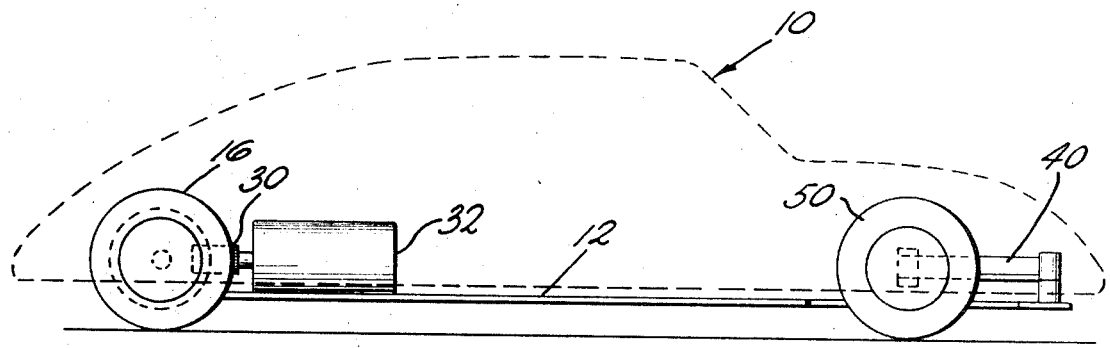
FIG. 2 is a schematic side elevational view of the embodiment of the invention illustrated in FIG. 1.

Before explaining the present invention in detail, it is to be understood that the invention is not limited in its application to the details of construction and arrangement of parts, illustrated in the accompanying drawing since the invention is capable of other embodiments and of being practiced or carried out in various ways. Also, it is to be understood that the phraseology or terminology employed herein is for the purpose of description and not of limitation.

Referring now to the drawing, the illustrated embodiment will be described in greater detail. As there shown, the wheeled vehicle 10 is provided with a frame structure 12 on which is mounted at the rear or at one end for independent rotation a pair of drive wheels 14 and 16. The wheel 14 is supported on the independent axle shaft 18 on which is carried a ring gear 20 which is in mesh with the pinion gear 22 of the motor means 24. Similarly, the wheel 16 is mounted on the independent axle shaft 26 which has fixed thereto the ring gear 28 which is in mesh with the pinion gear 30 driven by the motor means 32.

The motor means 24 and 32 each include variable speed electric motors and controls which are responsive to separate signals for independently controlling the speeds of such motors. These controls can be of a variety of types, such as those responsive to signals conducted by means of contacts from the surface on which the vehicle travels, or a suitable receiver may be provided for receiving signals from radio-transmitting equipment. The present invention is not directed to the specific type of signal receiving means that may be employed and therefore, no details of such control apparatus is disclosed in the present application.

From the foregoing description it will be understood that the wheels 14 and 16 can be driven at desired speeds which normally will be the same when it is desired to drive the vehicle in a straight line, and which can be varied so as to provide differential torque to the two oppositely powered wheels for turning purposes.

The forward or opposite end of the frame structure 12 includes the pivot pins 34 and 36 on which are pivotally mounted the arms 38 and 40. Mounted on the outer ends of the arms 38 and 40 are the pivot pins 42 and 44, to which is pivotally connected the tie rod 46 for maintaining the arms 38 and 40 in generally parallel relationship. Mounted for turning on the arms 38 and 40 are the unpowered or driven wheels 48 and 50. It will be recognized that the mounting means for each of the wheels 48 and 50 provides in effect a casterlike arrangement in which the wheels 48 and 50 are free to pivot around the pivot pins 34 and 36. Thus, when differential torque is applied to the frame by the drive wheels 14 and 16, the forward end of the vehicle 10 will readily turn in the direction of the applied torque. To restrict the extent of movement of the casterlike wheel mountings, limit stops 52 and 54 are provided, which are secured to the frame 12.

The illustrated embodiment is a rear wheel drive unit, but if desired, a front wheel drive can be provided merely by locating the wheels 14 and 16 and their respective motor means 24 and 32 at the forward end, and by arranging the wheels 48 and 50 at the rear end with the pivot pins 34 and 36 located forward of the wheels.

From the foregoing description it will be recognized that a very simple but effective arrangement has been provided for controlling the speed of the vehicle 10 by the use of two independent motor means 24 and 32, and simultaneously, merely by controlling the speeds of the individual motor means 24 and 32, an arrangement has been provided for effectively steering the vehicle. The simplicity inherent in the present construction results, among other factors, in a relatively low cost unit that can be readily manufactured.

In summary, in the present system of steering, the steering is accomplished through the application of differential torques to two oppositely powered wheels, which are fixed with respect to the longitudinal vehicle axis, while the unpowered wheels, which are arranged in a modified caster configuration, are allowed to turn freely and will thus comply automatically with the mechanical forces experienced while the vehicle is turning. It is to be recognized that the same apparatus that is provided for controlling the speed of the vehicle can be used simultaneously for controlling the steering of the vehicle. Thus, the control of the vehicle speed is accomplished through simultaneous variation of the torques supplied to the powered wheels and the control of the steering is accomplished by application of differential torques to the two opposite powered wheels.

We claim:

1. A wheeled vehicle comprising a frame structure, a pair of drive wheels mounted for independent rotation at one end of the frame, a pair of motor means supported on said frame for independent operation and each drivingly connected to a different one of said wheels, and a driven wheel pivotally mounted on a casterlike mounting at the other end of said frame, each of said motor means including a variable speed electric motor, said motors being responsive to separate control signals so that differential speeds can be imparted to said drive wheels.

2. A wheeled vehicle as defined by claim 1, wherein the casterlike mounting for said driven wheel comprises an axle shaft on which said driven wheel is mounted, an arm pivotally connected on a vertical axis at its one end to said frame and connected at its other end to said axle shaft.

3. A wheeled vehicle as defined by claim 2, wherein a second driven wheel is pivotally mounted on a second casterlike mounting at said other end of said frame.

4. A wheeled vehicle as defined by claim 3, wherein a tie bar is pivotally connected to and extends between the other ends of the arms so as to maintain a generally parallel relationship between the driven wheels.

5. A wheeled vehicle as defined by claim 4, wherein stop means are mounted on said frame structure to limit the extent of pivotal movement of said driven wheels.

6. A wheeled vehicle comprising a frame structure, a pair of drive wheels mounted for independent rotation at one end of said frame, a pair of variable speed electric motors supported on said frame for independent operation and each drivingly connected to a different one of said wheels, a pair of casters mounted at the other end of said frame, said electric motors being responsive to different signals so that varying driving torques can be applied selectively to each driven wheel.

7. A wheeled vehicle as defined by claim 6, wherein a tie bar is pivotally connected to the wheels of said casters to maintain the wheels in generally parallel relationship.

8. A wheeled vehicle as defined by claim 6, wherein limit stops are provided on said frame structure to limit the extent of pivoting of said casters.